(12) United States Patent
Kimura (10) Patent No.: US 7,424,205 B2
(45) Date of Patent: Sep. 9, 2008

(54) VIDEO PLAYER AND VIDEO PLAYING METHOD

(75) Inventor: Masaru Kimura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 998 days.

(21) Appl. No.: 10/854,748

(22) Filed: May 25, 2004

(65) Prior Publication Data

US 2005/0013587 A1    Jan. 20, 2005

(30) Foreign Application Priority Data

Jun. 5, 2003    (JP) .............................. 2003-160179

(51) Int. Cl.
*H04N 7/26*    (2006.01)
(52) U.S. Cl. ........................................ 386/95; 386/125
(58) Field of Classification Search .................... 386/95, 386/110, 111, 125, 126
See application file for complete search history.

(56) References Cited

U.S. PATENT DOCUMENTS 5,363,264 A * 11/1994 Cavanaugh et al. ......... 386/110

6,441,754 B1    8/2002  Wang et al.
7,224,890 B2 *  5/2007  Kato ........................... 386/111

FOREIGN PATENT DOCUMENTS

JP    2001-188735    7/2000

* cited by examiner

*Primary Examiner*—Thai Tran
*Assistant Examiner*—David A Hall
(74) *Attorney, Agent, or Firm*—Brinks Hofer Gilson & Lione (57) ABSTRACT

When a program chain to be played is determined, a system controller calculates the average bit rate in the program chain by dividing the amount of data of the program chain by the total play time of the program chain. The system controller also waits for a navigation pack to be played and calculates the average bit rate in a video object unit in accordance with a play time of the video object unit and the size of the video object unit. When the average bit rate of the program chain is greater than or equal to the average bit rate of the video object unit, frame pause is performed. When the average bit rate of the program chain is less than the average bit rate of the video object unit, field pause is performed.

17 Claims, 8 Drawing Sheets

| x | y | FRAME PAUSE | FIELD PAUSE |
|---|---|---|---|
| • AVERAGE BIT RATE IN PGC | • B-PICTURE BIT RATE (y1) | $0.1x \geq y1$ | $0.1x < y1$ |
| | • P-PICTURE BIT RATE (y2) | $0.5x \geq y2$ | $0.5x < y2$ |
| | • I-PICTURE BIT RATE (y3) | $1.5x \geq y3$ | $1.5x < y3$ |
| • B-PICTURE AVERAGE BIT RATE (x1)<br>• P-PICTURE AVERAGE BIT RATE (x2)<br>• I-PICTURE AVERAGE BIT RATE (x3) | • B-PICTURE BIT RATE (y1)<br>• P-PICTURE BIT RATE (y2)<br>• I-PICTURE BIT RATE (y3) | $x1 \geq y1$<br>$x2 \geq y2$<br>$x3 \geq y3$ | $x1 < y1$<br>$x2 < y2$<br>$x3 < y3$ |

VIDEO PLAYER AND VIDEO PLAYING METHOD

BACKGROUND OF THE INVENTION

1. Field of the Invention

The present invention relates to video players and video playing methods for performing pause processing, such as temporarily interrupting playing of video.

2. Description of the Related Art

Generally, an interlaced video frame includes two fields, and pause processing for freezing video includes frame pause and field pause. Frame pause means freezing video using two fields, and high resolution can be realized. However, since one frame is composed of two fields, which are temporally shifted relative to each other, high-speed motion video causes video blurring. In contrast, field pause means freezing video using one field. Although field pause does not cause video blurring, video resolution is reduced since half the number of scanning lines used for one-frame video is used.

As described above, each of frame pause and field pause has advantages and disadvantages. Thus, it is preferable to adopt an optimal method based on video motion.

For example, digital versatile discs (DVDs) and digital broadcasting adopt an MPEG system as a method for recording video. In the MPEG system, video is encoded using three types of methods, such as discrete cosine transform (DCT), motion compensation, and entropy coding, in order to reduce the amount of data of video signals. Motion compensation is a method for representing data of the current field or frame and data of the subsequent field or frame using motion vectors and difference values of data. Motion compensation enables a significant reduction in the amount of data. (For example, see Japanese Unexamined Patent Application Publication No. 2000-188735 (PP. 4-11, FIGS. 1-4).)

Such motion vectors represent the intensity of video motion and enable determination of which type of pause processing, field pause or frame pause, is suitable.

Due to the use of motion vectors, as disclosed in Japanese Unexamined Patent Application Publication No. 2000-188735, the intensity of motion of video compressed by the MPEG system can be known. This method, however, requires a high processing load. For example, in a case where one field is composed of 720×240 pixels and a motion vector is defined by a 16×16 pixel macroblock, one field includes 675 motion vectors. For bi-directional prediction or field prediction, this number is increased by a factor of two or four. For example, in a case where the number of motion vectors is increased by a factor of four (that is, 675×4=2,700), some kind of calculation must be performed for more than 2,000 motion vectors at the moment of pause processing. Thus, the processing load is increased. Therefore, use of an expensive CPU with high processing power or an increase in the size of a circuit for parallel processing is needed.

SUMMARY OF THE INVENTION

Accordingly, the present invention is designed in view of the problems described above, and it is an object of the present invention to provide a video player and a video playing method capable of reducing the processing load for determining the type of pause processing suitable for the details of video.

In order to achieve the above object, a video player according to the present invention includes a first bit rate calculating section for calculating a first bit rate of a video unit to be paused; a second bit rate calculating section for calculating a second bit rate of video played for a predetermined period; a bit rate comparing section for comparing the first bit rate calculated by the first bit rate calculating section with the second bit rate calculated by the second bit rate calculating section; a pause determining section for determining the type of pause processing suitable for the video unit in accordance with the results obtained by the bit rate comparing section when a pause instruction for freezing the video unit is given; and a video playing section for playing the video and for performing the pause processing determined by the pause determining section when the pause instruction is given.

Also, a video playing method according to the present invention includes a first step of calculating a first bit rate of a video unit to be paused; a second step of calculating a second bit rate of video played for a predetermined period; a third step of comparing the first bit rate calculated by the first step with the second bit rate calculated by the second step; a fourth step of determining the type of pause processing suitable for the video unit in accordance with the results obtained by the third step when a pause instruction for freezing the video unit is given; and a fifth step of performing the pause processing determined by the fourth step in accordance with the pause instruction when the video is being played.

Since the type of pause processing is determined on the basis of the bit rate of a video unit, the necessity of complicated calculation, such as calculation of a motion vector, is eliminated. Thus, the processing load can be reduced. Therefore, there is no need to use an expensive CPU with high processing power or to increase the size of a circuit for parallel processing.

Also, preferably, the type of pause processing determined by the pause determining section is frame pause or field pause. Since the speed of video motion can be known on the basis of the bit rate of a video unit, frame pause or field pause can be selectively performed in accordance with the speed of the motion.

Also, preferably, the pause determining section selects the frame pause when the first bit rate is lower than or equal to the second bit rate and selects the field pause when the first bit rate is higher than the second bit rate. Thus, the frame pause is performed when the bit rate of a video unit to be paused is lower than or equal to the average bit rate of video played for a predetermined period, that is, when the speed of video motion is slow. In contrast, when the speed of video motion is fast, the field pause is performed. Consequently, pause processing suitable for the details of video can be performed.

Also, preferably, the video is based on the DVD-Video standards. It is also preferable that the second bit rate calculating section calculate the second bit rate by dividing the amount of data of a program chain being played by the total play time of the program chain. Thus, the average bit rate of video corresponding to the whole program chain can be readily calculated. Therefore, the processing load for determining the type of pause processing can be reduced.

Also, preferably, the first bit rate calculating section calculates the first bit rate by dividing the size of a video object unit obtained in accordance with data search information included in a navigation pack by a play time of the video object unit obtained in accordance with presentation control information. Thus, the bit rate of a video object unit including a video unit to be paused can be readily calculated. Therefore, the processing load for determining the type of pause processing can be reduced.

Also, preferably, the video is recorded by an MPEG system. It is also preferable that the first bit rate calculating section calculate the first bit rate for each picture to be paused.

Thus, the speed of video motion for each picture to be paused can be known. Therefore, pause processing suitable for the details of video can be further realized.

Also, preferably, the video is based on the DVD-Video standards. It is also preferable that the second bit rate calculating section calculate the second bit rate by dividing the amount of data of a program chain being played by the total play time of the program chain and that the bit rate comparing section compare a reference value obtained by multiplying the second bit rate by a value corresponding to the type of picture with the first bit rate. Thus, the speed of video motion can be determined with higher accuracy by using reference values different among pictures, whose compression rates are different from each other, in other words, a B-picture, a P-picture, and an I-picture.

Also, preferably, the second bit rate calculating section calculates the second bit rate by obtaining the average bit rate for each type of picture after the video playing section starts playing the video. Thus, it can be known whether or not a picture to be paused is a scene whose speed of motion is fast. Therefore, pause processing suitable for the details of video can be performed.

Also, preferably, when an I-picture is to be paused, the pause determining section determines the type of pause processing by obtaining a motion vector of pictures preceding and subsequent to the I-picture. Thus, the type of pause processing suitable for the details of video can be determined even for I-pictures in which it is difficult to determine the type of pause processing only by a bit rate.

DETAILED DESCRIPTION OF PREFERRED EMBODIMENTS

A disc player according to an embodiment of the present invention will be described with reference to the drawings.

The details of data recorded on a DVD, which is a disc recording medium, will be explained.

Figure 1:
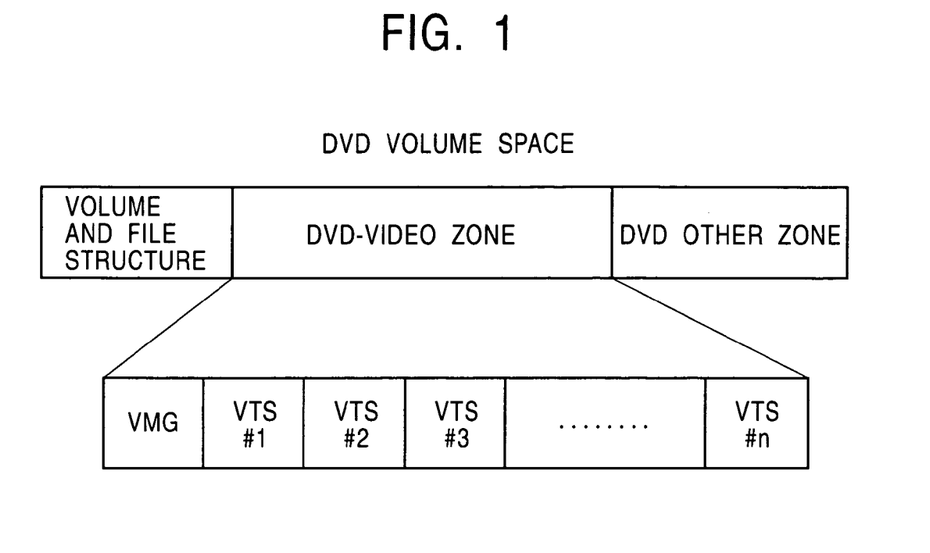
FIG. 1 shows the structure of a DVD volume space.

FIG. 1 shows the structure of a DVD volume space. Referring to FIG. 1, the DVD volume space includes a volume and file structure, a DVD-Video zone, and a DVD other zone in that order from the inner to outer periphery of the DVD. The DVD-Video zone contains various types of data necessary for playing. The DVD-Video zone includes a video manager (VMG) and one or more video title sets (VTSs) corresponding to respective titles.

Figure 2:
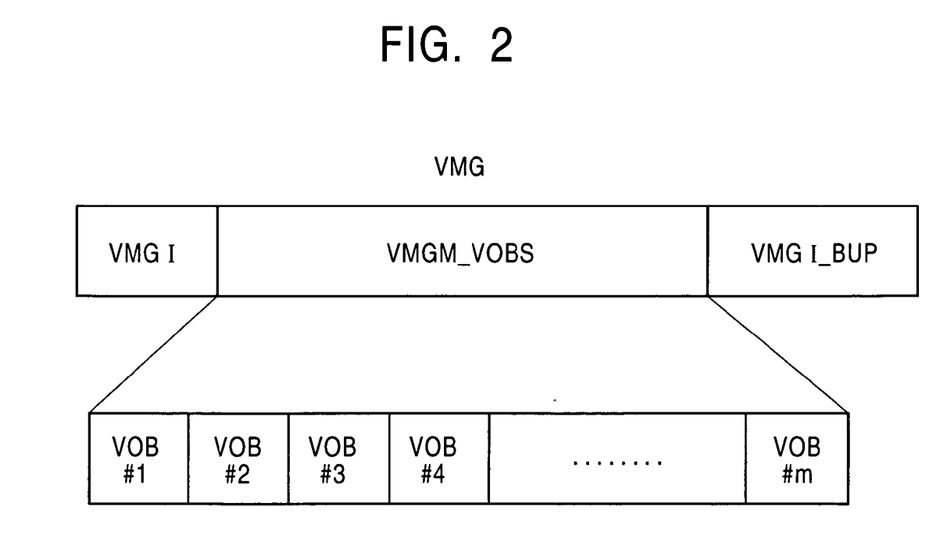
FIG. 2 shows the data structure of a VMG.

FIG. 2 shows the data structure of the VMG. Referring to FIG. 2, the VMG includes video manager information (VMGI), a video object set for a VMG menu (VMGM_VOBS), and a backup file for the VMGI (VMGI_BUP).

The VMGI includes information on the VTSs (including the number of VTSs, the numbers of the VTSs for identifying the respective VTSs, and the stored positions of the respective VTSs in the DVD), a display order of titles displayed in a title menu, one or more pieces of program chain information (PGCI), a disc ID for identifying the DVD (DVD_ID), the name of the disc (for example, the title of a movie), and the like. The VMGM_VOBS includes one or more video objects (VOBs). Each of the VOBs includes video data, which is playback data when a menu screen (that is, a title menu screen) for selecting a title is played.

Figure 3:
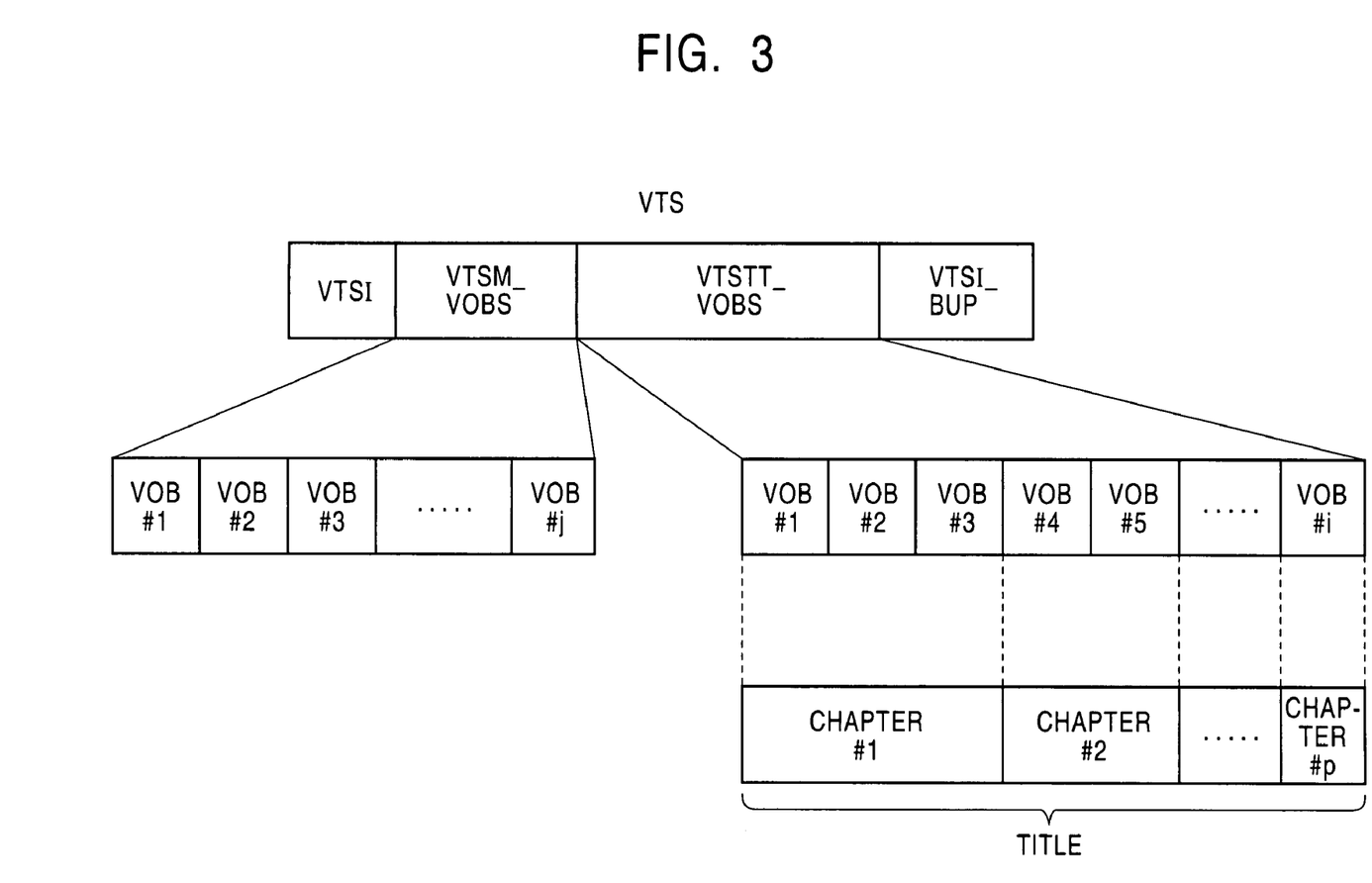
FIG. 3 shows the data structure of a VTS.

FIG. 3 shows the data structure of each of the VTSs. Referring to FIG. 3, each of the VTSs includes video title set information (VTSI), a video object set for a VTS menu (VTSM_VOBS), a video object set for a VTS title (VTSTT_VOBS), and a backup file for the VTSI (VTSI_BUP).

The VTSI includes information about the title, the numbers of the chapters (PTTs) in the VTS for identifying the respective chapters, and one or more pieces of PGCI. Each of the VTSM_VOBS and the VTSTT_VOBS includes one or more VOBs. Each of the VOBs includes playback data, such as video data and audio data.

Playback data of the title is included in VOBs #1 to #i of the VTSTT_VOBS. A chapter is a unit obtained by dividing a title, and playback data of a chapter is included in one or more VOBs in the VTSTT_VOBS. For example, as shown in FIG. 3, a title is divided into chapters #1 through #p. Playback data of chapter #1 is included in VOBs #1 through #3, and playback data of chapter #2 is included in VOBs #4 through #5.

Figure 4:
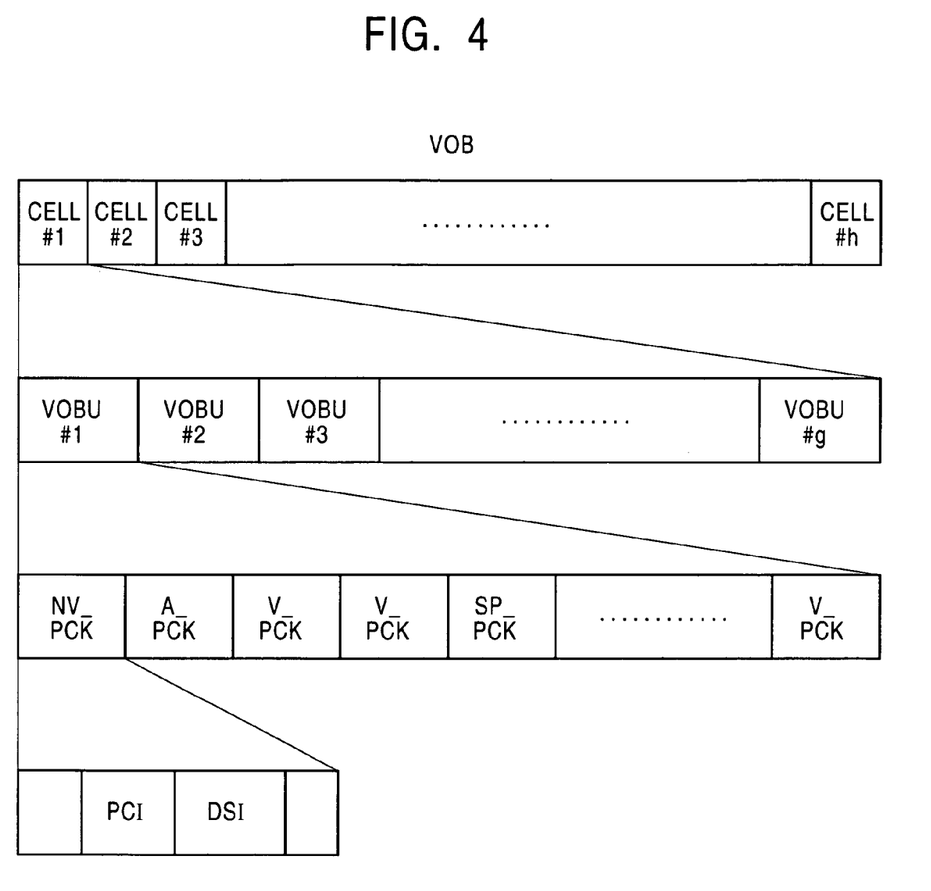
FIG. 4 shows the data structure of a VOB.

FIG. 4 shows the data structure of each of the VOBs included in the VMGM_VOBS, the VTSM_VOBS, or the VTSTT_VOBS. Referring to FIG. 4, the VOB includes a plurality of cells. Each of the cells includes a plurality of video object units (VOBUs).

Each of the VOBUs includes at least one of a navigation pack (NV_PCK), a video pack (V_PCK), a subpicture pack (SP_PCK), and an audio pack (A_PCK).

The NV_PCK includes presentation control information (PCI) and data search information (DSI). The PCI includes PCI general information (PCI_GI) including presentation start time for video data in the VOBU (VOBU_S_PTM) and presentation end time for the video data in the VOBU (VOBU_E_PTM). Also, the DSI includes DSI general information (DSI_GI) including an address of the last pack of the VOBU (VOBU_EA) for obtaining the size of the VOBU.

The V_PCK, the SP_PCK, and the A_PCK include a pack header and a packet header including information about the type of playback data, such as a moving image, a subpicture, and audio, respectively. The V_PCK, the SP_PCK, and the A_PCK also include compressed playback data, such as video data, subpicture data, and audio data, respectively, compressed by the MPEG system.

A program chain (PGC), which is a logical playback unit for playing, includes the program chain information (PGCI) and a plurality of cells included in one or more VOBs. For example, one piece of PGCI in VMGI and cells included in VOBs in a VMGM_VOBS constitute a PGC. Also, one piece of PGCI in VTSI and cells included in VOBs in a VTSM_VOBS constitute a PGC. Also, one piece of PGCI in VTSI and cells included in VOBs in a VTSTT_VOBS constitute a PGC.

Figure 5:
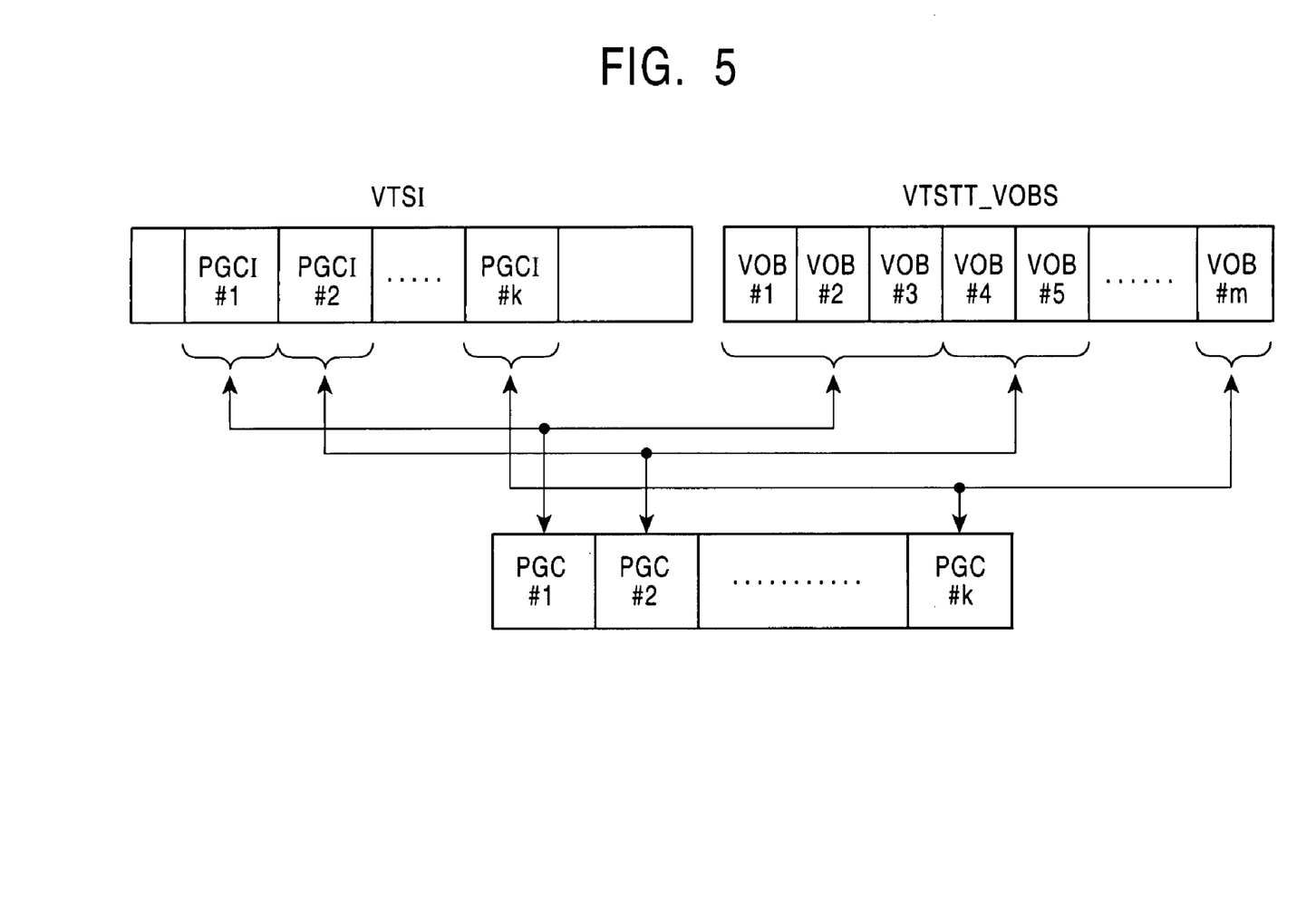
FIG. 5 shows an example of the structure of a PGC.

FIG. 5 shows an example of the structure of the PGC. In FIG. 5, an example of a PGC including PGCI in VTSI and cells included in VOBs in a VTSTT_VOBS is shown. As shown in FIG. 5, for example, a PGC#1 includes PGCI#1 in the VTSI and cells included in VOBs #1 through #3 in the VTSTT_VOBS. Also, a PGC #2 includes PGCI#2 in the VTSI and cells included in VOBs #4 and #5 in the VTSTT_VOBS.

A PGC including PGCI in the VMGI and cells included in VOBs in the VMGM_VOBS and a PGC including PGCI in the VTSI and cells included in VOBs in the VTSM_VOBS also have a structure similar to that of the PGC shown in FIG. 5. Also, the PGCI includes self playback information (C_PBI) used for calculating the amount of PGC data and PGC general information (PGC_GI) used for obtaining the total play time of the PGC.

Figure 6:
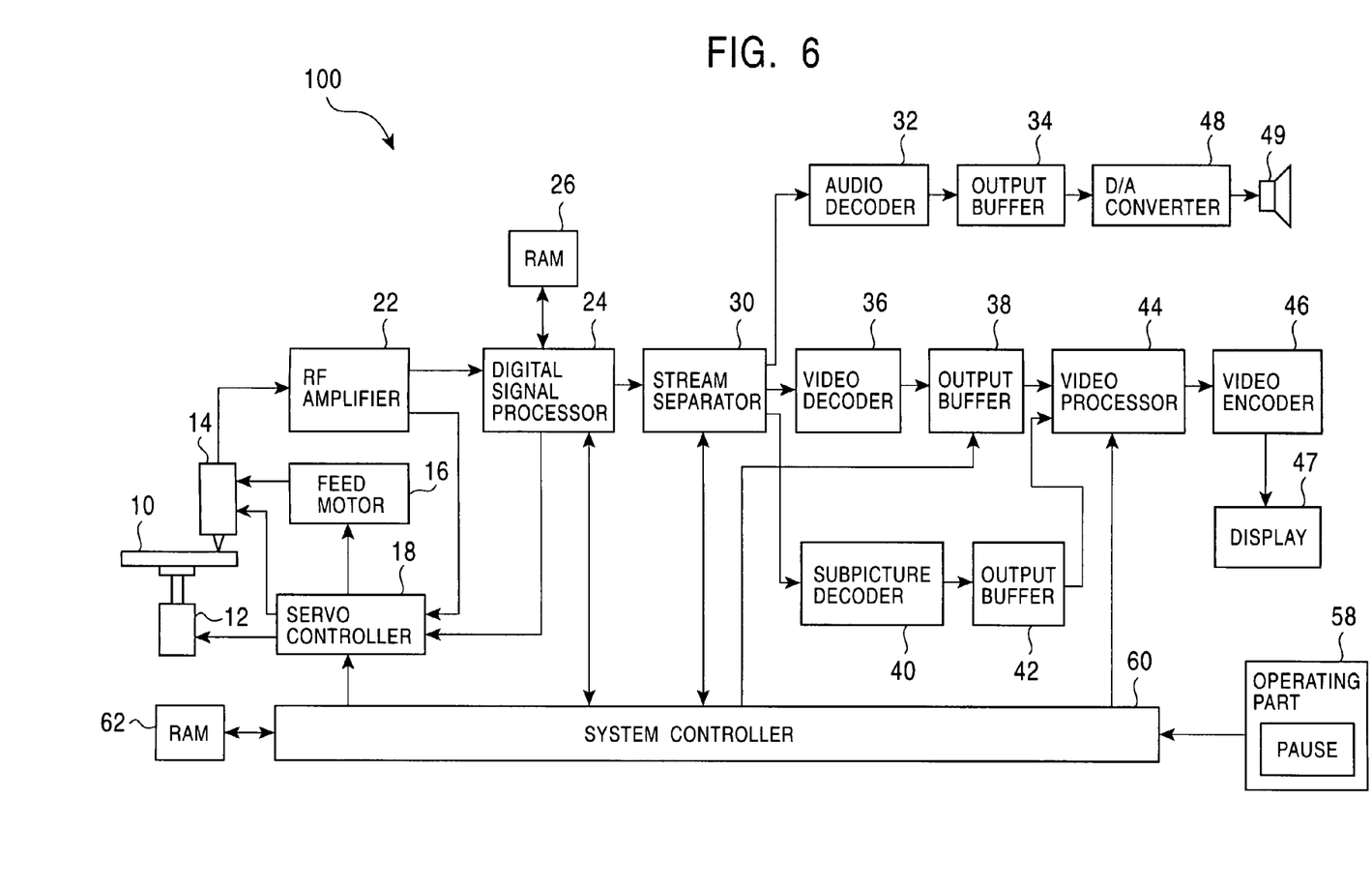
FIG. 6 shows the general structure of a disc player according to an embodiment of the present invention.

FIG. 6 shows the general structure of a disc player 100, which is a video player, according to this embodiment. Referring to FIG. 6, the disc player 100 includes a spindle motor 12, an optical pickup 14, a feed motor 16, a servo controller 18, an RF amplifier 22, a digital signal processor 24, a buffer RAM 26, a stream separator 30, an audio decoder 32, output buffers 34, 38, and 42, a video decoder 36, a subpicture decoder 40, a video processor 44, a video encoder 46, a display 47, a digital-to-analog (D/A) converter 48, a speaker 49, an operating part 58, a system controller 60, and a RAM 62.

The spindle motor 12 rotates a DVD 10 at a predetermined speed. The optical pickup 14 detects data recorded on the DVD 10 and contains, for example, a semiconductor laser and a photodiode. The feed motor 16 moves the optical pickup 14 in the radial direction of the DVD 10.

The servo controller 18 actuates the spindle motor 12 and the feed motor 16 in accordance with an instruction from the system controller 60, and moves a focal position of the semiconductor laser in the vertical direction and in the horizontal direction with respect to a recording surface of the DVD 10 by moving an objective lens (not shown) contained in the optical pickup 14. Also, the servo controller 18 controls various servos, such as a focus servo, a tracking servo, and a rotation servo, necessary for reading data from the DVD 10.

The RF amplifier 22 amplifies an electrical signal received from the photodiode contained in the optical pickup 14. The digital signal processor 24 converts a signal received from the RF amplifier 22 into digital data. Then, the digital signal processor 24 performs signal demodulation (8-16 demodulation) and error correction corresponding to a data format of the DVD 10 and stores the processed data in the buffer RAM 26. The digital signal processor 24 extracts the VMGI and the VTSI from the data stored in the buffer RAM 26 and outputs the extracted VMGI and VTSI to the system controller 60 in accordance with an instruction from the system controller 60. The digital signal processor 24 also extracts the VOBU and supplies the extracted VOBU to the stream separator 30.

The stream separator 30 analyzes a pack header of the VOBU received from the digital signal processor 24 in accordance with an instruction from the system controller 60 so that the VOBU is separated into the A_PCK, the V_PCK, the SP_PCK, and the NV_PCK. The A_PCK, the V_PCK, and the SP_PCK separated by the stream separator 30 are supplied to the audio decoder 32, the video decoder 36, and the subpicture decoder 40, respectively. Also, the NV_PCK separated by the stream separator 30 is transferred to the system controller 60.

The audio decoder 32 performs predetermined decoding for the A_PCK received from the stream separator 30 to produce audio data. The video decoder 36 performs predetermined decoding for the V_PCK received from the stream separator 30 to produce video data. The subpicture decoder 40 performs predetermined decoding for the SP_PCK received from the stream separator 30 to produce subpicture data.

The video processor 44 creates image data by combining the video data supplied by the video decoder 36 and the subpicture data supplied by the subpicture decoder 40 in accordance with an instruction from the system controller 60. The video processor 44 supplies the created image data to the video encoder 46.

The video encoder 46 converts the image data received from the video processor 44 into an image signal for display. Providing the image signal to the display 47 enables an image to be displayed.

The D/A converter 48 converts the audio data received from the audio decoder 32 into an analog audio signal. Providing the audio signal to the speaker 49 enables an audio voice to be played.

The operating part 58 includes various operation keys, such as a play key for an instruction to start playing; a stop key for an instruction to stop playing; a pause key for an instruction to pause playing; right, left, up, and down cursor keys; and a selection key for selecting an item indicated by a cursor on the screen. The operating part 58 provides a signal to the system controller 60 in accordance with a key operation.

The system controller 60 controls all the function blocks, such as issuing various servo instructions to the servo controller 18 and issuing an instruction to create an image to the video processor 44 in accordance with an operation instruction from a user. Also, the system controller 60 determines the type of pause processing suitable for the details (the speed of motion) of video at the time when a pause instruction to freeze video is given by a user, and performs frame pause or field pause.

The system controller 60 corresponds to first and second bit rate calculating sections, a bit rate comparing section, and a pause determining section. The system controller 60, the spindle motor 12, the optical pickup 14, the feed motor 16, the servo controller 18, the RF amplifier 22, the digital signal processor 24, the stream separator 30, the video decoder 36, and the output buffer 38 correspond to a video playing section.

Figure 7:
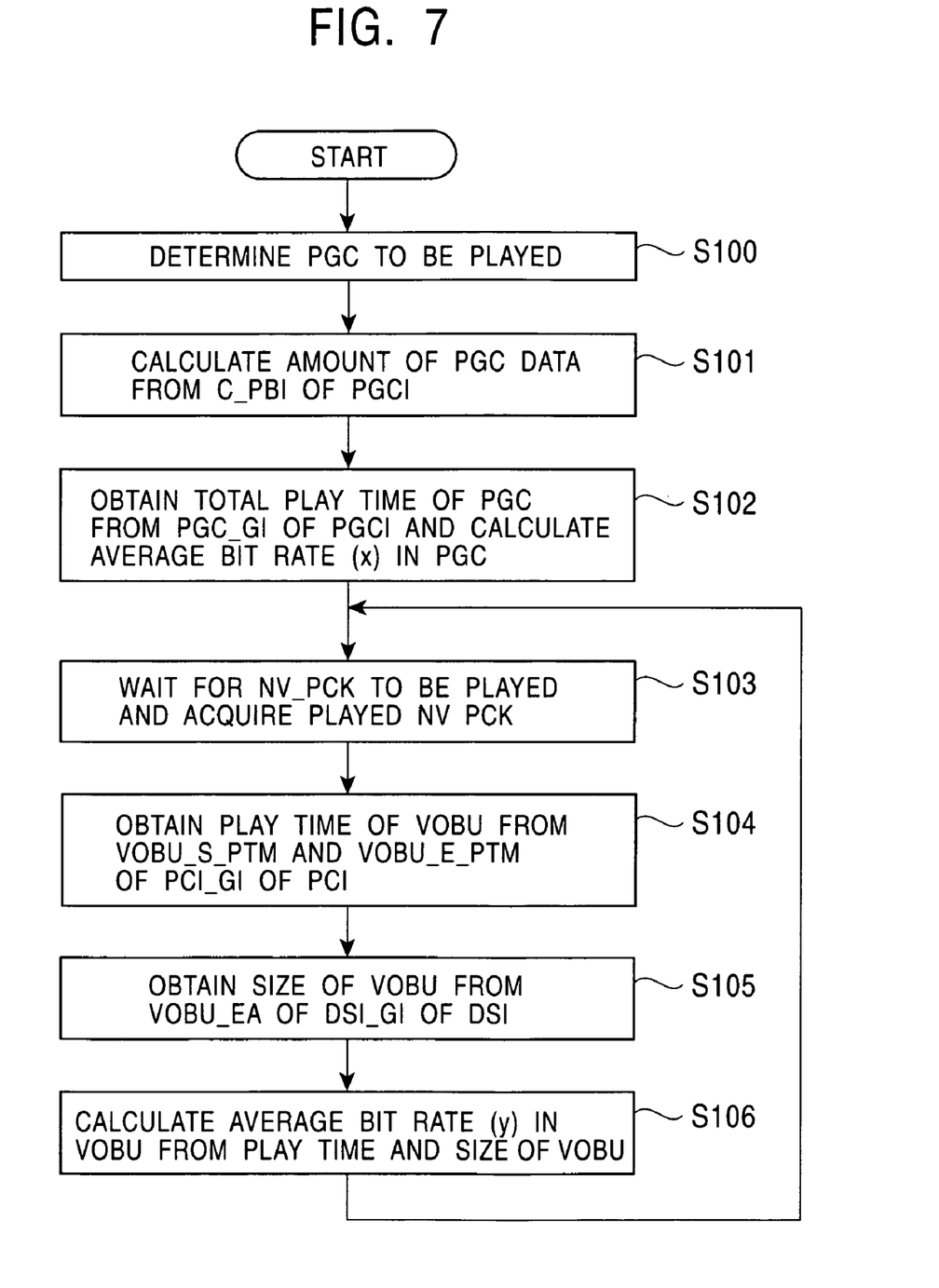
FIG. 7 is a flowchart showing a process performed by the disc player for acquiring information necessary for determining whether or not the speed of video motion is fast.

The operation of the disc player 100 according to this embodiment arranged as described above will now be described. FIG. 7 is a flowchart of a process performed by the disc player 100 for acquiring information necessary for determining whether or not the speed of video motion is fast.

When a PGC to be played is determined (step S100), the system controller 60 calculates the amount of data of the PGC from the C_PBI of the PGCI included in the PGC (step SI 01). The system controller 60 also obtains the total play time of the PGC from the PGC_GI of the PGCI and calculates the average bit rate (x) in the PGC by dividing the amount of the data of the PGC by the total play time of the PGC (step S102).

The system controller 60 waits for a NV_PCK to be played and acquires the played NV_PCK (step S103). The system controller 60 obtains a play time of a VOBU in accordance with the VOBU_S_PTM and the VOBU_E_PTM of the PCI_GI of the PCI included in the NV_PCK (step S104) and obtains the size of the VOBU from the VOBU_EA of the DSI_GI of the DSI (step S105). Then, the system controller 60 calculates the average bit rate (y) in the VOBU from the play time of the VOBU and the size of the VOBU (step S106).

Then the process returns to step S103. When a new NV_PCK is played, the processing in steps S104 through S106 is repeated.

Accordingly, the average bit rate (x) in the PGC and the average bit rate (y) in the VOBU are calculated. For example, if the average bit rate (y) in the VOBU corresponding to a video unit being played is lower than or equal to the average bit rate (x) in the PGC corresponding to video over a certain amount of time, it is determined that the moving speed of the video unit being played is slow. In the opposite case, it is determined that the moving speed of the video unit being played is fast.

Figure 8:
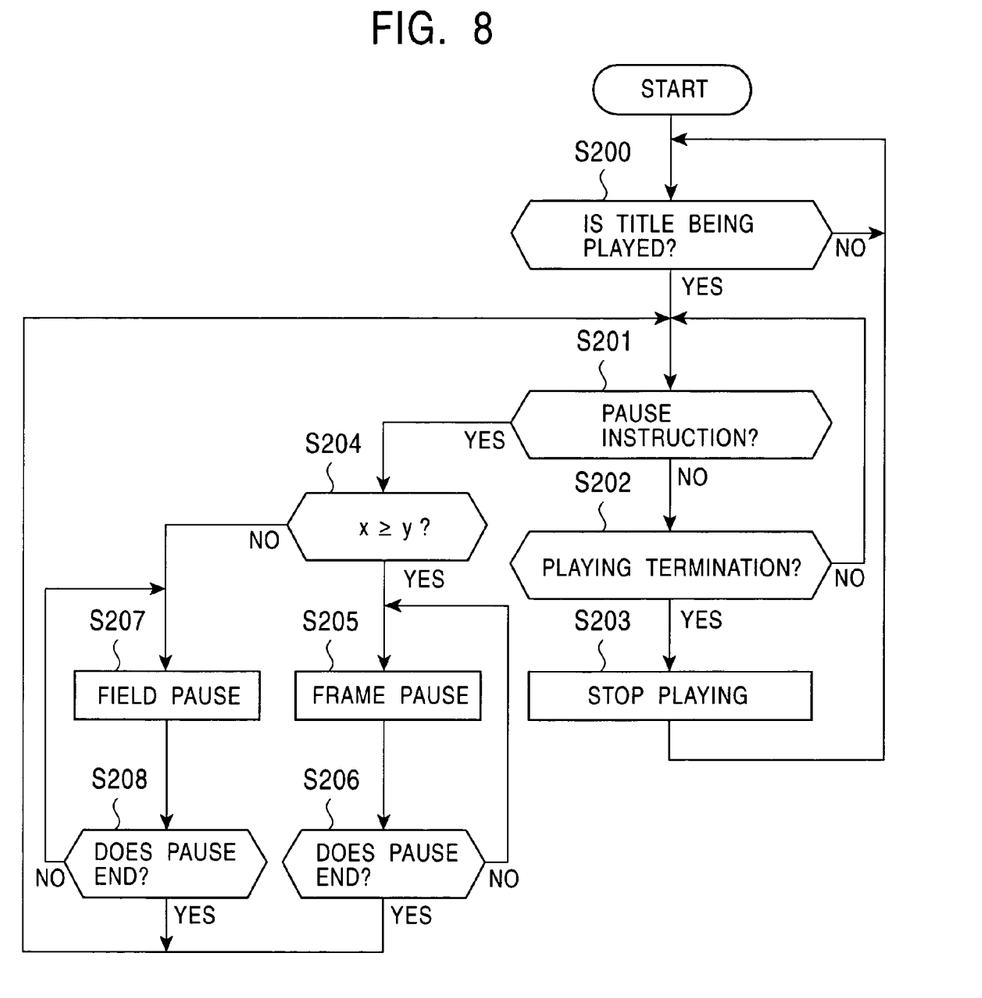
FIG. 8 is a flowchart showing a process performed by the disc player for performing pause processing in accordance with video motion.

FIG. 8 is a flowchart of a process performed by the disc player 100 for performing pause processing in accordance with video motion.

The system controller 60 determines whether or not a title is being played (step S200). If playing of the title does not start, the determination in step S200 is negative and the determination is repeated. If playing of the title starts, the determination in step S200 is affirmative. The system controller 60 determines whether or not the pause key of the operating part 58 is pressed to give a pause instruction (step S201). If the pause instruction is not given, the determination in step S201 is negative, and the system controller 60 determines whether or not an instruction for termination of playing is given (step S202). If the instruction for termination of playing is not given, the determination in step S202 is negative, and the process returns to step S201 to repeat determination of whether or not the pause instruction is given. If the instruction for termination of playing is given, the determination in step S202 is affirmative, and playing of the title terminates (step S203). Then, the process returns to step S200 to repeat the determination of whether or not a title is being played.

If the pause key is pressed to give the pause instruction, the determination in step S201 is affirmative. The system controller 60 determines whether or not the average bit rate (x) in the PGC is greater than or equal to the average bit rate (y) in the VOBU (step S204). If the expression $x \geq y$ is satisfied, the speed of the video motion at the time when the pause instruction is given is determined to be slow. The determination in step S204 is affirmative, and the system controller 60 performs frame pause (step S205). An instruction for frame pause sent from the system controller 60 to the output buffer 38 causes frame pause to be performed. Then, the system controller 60 determines whether or not pause terminates (step S206). For example, if the pause key of the operating part 58 is pressed again, the determination in step S206 is affirmative. The process returns to step S201 to repeat the processing of determining whether or not the pause instruction is given and the subsequent processing. If the pause key of the operating part 58 is not pressed again, the determination in step S206 is negative. The process returns to step S205 to continue frame pause until the pause key of the operating part 58 is pressed again.

If the expression $x<y$ is satisfied, the speed of the video motion at the time when the pause instruction is given is determined to be fast. The determination in step S204 is negative, and the system controller 60 performs field pause (step S207). An instruction for field pause sent from the system controller 60 to the output buffer 38 causes the field pause to be performed. Then, the system controller 60 determines whether or not pause terminates (step S208). If the pause key of the operating part 58 is pressed again, the determination in step S208 is affirmative. The process returns to step S201 to repeat the processing of determining whether or not the pause instruction is given and the subsequent processing. If the pause key of the operating part 58 is not pressed again, the determination in step S208 is negative. The process returns to step S207 to continue field pause until the pause key of the operating part 58 is pressed again.

As described above, the disc player 100 according to this embodiment determines the speed of video motion on the basis of the average bit rate (x) in a PGC and the average bit rate (y) in a VOBU, and need only read data necessary for calculation of such bit rates from corresponding sections on a disc. Thus, the processing load for determining the type of pause processing suitable for the details (the speed of motion) of video can be significantly reduced. Consequently, the need for an expensive CPU with high processing power or for an increase in the size of a circuit for parallel processing can be eliminated.

The present invention is not limited to the embodiment described above. Various modifications can be made to the present invention without departing from the spirit and the scope thereof. Although the type of pause processing is selected between frame pause and field pause in accordance with the relationship between the average bit rate (x) in a PGC and the average bit rate (y) in a VOBU in the embodiment described above, other criteria of determination may be used. For example, frame pause may be performed when the expression $2x \geq y$ is satisfied, and field pause may be performed when the expression $2x<y$ is satisfied.

Also, although the speed of video motion is determined by calculating the average bit rate for each VOBU in the embodiment described above, since the VOBU includes three types of pictures, such as an I-picture, a B-picture, and a P-picture, the speed of video motion may be determined by calculating the bit rate of a picture actually to be paused.

Figure 9:
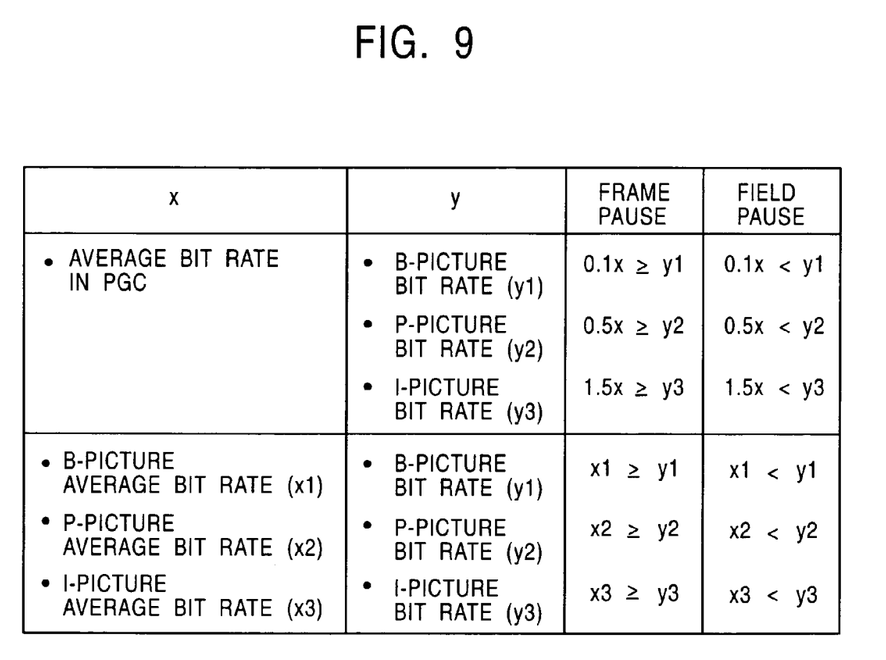
FIG. 9 shows the criteria for determining the speed of video motion by calculating the bit rate of each picture to be paused.

FIG. 9 shows the criteria for determining the speed of video motion by calculating the bit rate of each picture to be paused.

The bit rate of each picture (in other words, the bit rate y1 of a B-picture, the bit rate y2 of a P-picture, or the bit rate y3 of an I-picture) to be paused can be calculated by obtaining the type of picture from a picture header of an MPEG Video stream of a V_PCK and by obtaining the size of the picture from the amount of data in the picture header.

The type of pause processing is selected between frame pause and field pause by comparing the bit rate of each picture calculated as described above with a predetermined reference value. Two types of reference values, as shown in FIG. 9, are possible.

First, a case where the average bit rate (x) in a PGC is used is possible. No motion compensation is used for I-pictures, one type of motion vector is used for P-pictures, and two types of motion vectors are used for B-pictures. Thus, the compression rates of B-pictures, P-pictures, and I-pictures are reduced in that order. Therefore, for the B-picture, the average bit rate (x) is multiplied by 0.1 as a reference value. Frame pause is performed when the expression $0.1x \geq y1$ is satisfied and field pause is performed when the expression $0.1x<y1$ is satisfied. For the P-picture, the average bit rate (x) is multiplied by 0.5 as a reference value. Frame pause is performed when the expression $0.5x \geq y2$ is satisfied and field pause is performed when the expression $0.5x<y2$ is satisfied. For the I-picture, the average bit rate (x) is multiplied by 1.5 as a reference value. Frame pause is performed when the expression $1.5x \geq y3$ is satisfied and field pause is performed when the expression $1.5x<y3$ is satisfied.

Second, a case where the average bit rates calculated for respective pictures (in other words, the average bit rate x1 of a B-picture, the average bit rate x2 of a P-picture, and the average bit rate x3 of an I-picture) are used is possible. Such average bit rates are calculated by regularly extracting the type of picture and the amount of data for the respective pictures after playing of a title starts. For the B-picture, frame pause is performed when the expression $x1 \geq y1$ is satisfied and field pause is performed when the expression $x1<y1$ is satisfied. For the P-picture, frame pause is performed when the expression $x2 \geq y2$ is satisfied and field pause is performed when the expression $x2<y2$ is satisfied. For the I-picture, frame pause is performed when the expression $x3 \geq y3$ is satisfied and field pause is performed when the expression $x3<y3$ is satisfied.

Accordingly, the bit rate is calculated for each picture to be paused. Thus, high accuracy in determination of the details can be realized even with a low processing load, and frame pause or field pause is performed in accordance with the details of video.

The bit rate of I-pictures depends heavily on the complexity of the details rather than the speed of video motion. Thus, in a case where an I-picture is to be paused, it is preferable that frame pause or field pause be determined by calculating only a motion vector of preceding and subsequent pictures and by determining whether or not the I-picture is a scene whose motion speed is fast.

A case where video is paused in the disc player 100 is explained in the embodiment described above. The disc player 100 may be other disc devices on which video can be written. The present invention is applicable not only to a case where video is paused in the disc player 100 but also to a case where video is paused in other video players, such as a broadcasting receiver, for playing video compressed by the MPEG system.

It is therefore intended that the foregoing detailed description be regarded as illustrative rather than limiting, and that it be understood that it is the following claims, including all equivalents, that are intended to define the spirit and scope of this invention.

The invention claimed is:

1. A video player comprising:
   a first bit rate calculating section for calculating a first bit rate of a video unit to be paused;
   a second bit rate calculating section for calculating a second bit rate of video played for a predetermined period;
   a bit rate comparing section for comparing the first bit rate calculated by the first bit rate calculating section with the second bit rate calculated by the second bit rate calculating section;
   a pause determining section for determining the type of pause processing suitable for the video unit in accordance with the results obtained by the bit rate comparing section when a pause instruction for freezing the video unit is given; and
   a video playing section for playing the video and for performing the pause processing determined by the pause determining section when the pause instruction is given, wherein the type of pause processing determined by the pause determining section is frame pause or field pause.

2. A video player according to claim 1, wherein:
   the pause determining section selects the frame pause when the first bit rate is less than or equal to the second bit rate; and
   the pause determining section selects the field pause when the first bit rate is greater than the second bit rate.

3. A video player according to claim 2, wherein:
   the video is based on the DVD-Video standards; and
   the second bit rate calculating section calculates the second bit rate by dividing the amount of data of a program chain being played by the total play time of the program chain.

4. A video player according to claim 3, wherein the first bit rate calculating section calculates the first bit rate by dividing the size of a video object unit obtained in accordance with data search information included in a navigation pack by a play time of the video object unit obtained in accordance with presentation control information.

5. A video player according to claim 1, wherein:
   the video is recorded by an MPEG system; and
   the first bit rate calculating section calculates the first bit rate for each picture to be paused.

6. A video player according to claim 5, wherein:
   the video is based on the DVD-Video standards;
   the second bit rate calculating section calculates the second bit rate by dividing the amount of data of a program chain being played by the total play time of the program chain; and
   the bit rate comparing section compares a reference value obtained by multiplying the second bit rate by a value corresponding to the type of picture with the first bit rate.

7. A video player according to claim 5, wherein the second bit rate calculating section calculates the second bit rate by obtaining the average bit rate for each type of picture after the video playing section starts playing the video.

8. A video player according to claim 5, wherein, when an I-picture is to be paused, the pause determining section determines the type of pause processing by obtaining a motion vector of pictures preceding and subsequent to the I-picture.

9. A video playing method comprising:
   calculating a first bit rate of a video unit to be paused;
   calculating a second bit rate of video played for a predetermined period;
   comparing the first bit rate with the second bit rate;
   determining the type of pause processing suitable for the video unit in accordance with the results obtained by the comparing act when a pause instruction for freezing the video unit is given; and
   performing the pause processing determined by the determining act in accordance with the pause instruction when the video is being played, wherein the type of pause processing determined by the determining act is frame pause or field pause.

10. A video playing method according to claim 9, wherein:
    the determining act selects the frame pause when the first bit rate is less than or equal to the second bit rate; and
    the determining act selects the field pause when the first bit rate is greater than the second bit rate.

11. A video playing method according to claim 9, wherein:
    the video is based on the DVD-Video standards; and
    the second bit rate is calculated by dividing the amount of data of a program chain being played by the total play time of the program chain.

12. A video playing method according to claim 9, wherein the first bit rate is calculated by dividing the size of a video object unit obtained in accordance with data search information included in a navigation pack by a play time of the video object unit obtained in accordance with presentation control information.

13. A video playing method according to claim 9, wherein:
    the video is recorded by an MPEG system; and
    the first bit rate is calculated for each picture to be paused.

14. A video playing method according to claim 9, wherein:
    the video is based on the DVD-Video standards;
    the second bit rate is calculated by dividing the amount of data of a program chain being played by the total play time of the program chain; and
    the comparing act compares a reference value obtained by multiplying the second bit rate by a value corresponding to the type of picture with the first bit rate.

15. A video playing method according to claim 9, wherein the second bit rate is calculated by obtaining the average bit rate for each type of picture after a video playing section starts playing the video.

16. A video playing method according to claim 9, wherein, when an I-picture is to be paused, the determining act determines the type of pause processing by obtaining a motion vector of pictures preceding and subsequent to the I-picture.

17. A video playing method comprising:
- a first step of calculating a first bit rate of a video unit to be paused by dividing the size of a video object unit obtained in accordance with data search information included in a navigation pack by a play time of the video object unit obtained in accordance with presentation control information;
- a second step of calculating a second bit rate of video played for a predetermined period by dividing the amount of data of a program chain being played by the total play time of the program chain;
- a third step of comparing the first bit rate calculated by the first step with the second bit rate calculated by the second step;
- a fourth step of selecting frame pause when the first bit rate is less than or equal to the second bit rate and selecting field pause when the first bit rate is greater than the second bit rate in accordance with the results obtained by the third step when a pause instruction for freezing the video unit is given; and
- a fifth step of performing the pause processing determined by the fourth step in accordance with the pause instruction when the video is being played.

* * * * *